United States Patent [19]
Bennett

[11] Patent Number: 5,395,192
[45] Date of Patent: Mar. 7, 1995

[54] LOCKING NUT ASSEMBLY FOR BEARING HUB OF FOUR WHEEL DRIVE VEHICLE

[76] Inventor: Bruce A. Bennett, 15 Chestnut Ave., San Rafael, Calif. 94901

[21] Appl. No.: 116,256

[22] Filed: Sep. 2, 1993

[51] Int. Cl.⁶ .............................................. F16B 39/10
[52] U.S. Cl. ..................................... 411/120; 411/198; 411/203
[58] Field of Search .............................. 411/119–121, 411/131, 198–203, 974, 985

[56] References Cited

U.S. PATENT DOCUMENTS

| | | | |
|---|---|---|---|
| 950,071 | 2/1910 | Luckey | 411/199 |
| 1,199,548 | 9/1916 | Hedderwick | 411/198 |
| 1,328,443 | 1/1920 | Marburger et al. | 411/203 |
| 1,448,178 | 3/1923 | Andrix | 411/198 |
| 3,382,905 | 5/1968 | Gutshall | 411/198 |
| 4,734,001 | 3/1988 | Bennett | 411/120 X |
| 4,737,058 | 4/1988 | Callman et al. | 411/120 |

FOREIGN PATENT DOCUMENTS 371254  4/1932  United Kingdom ................ 411/198

*Primary Examiner*—Neill R. Wilson
*Attorney, Agent, or Firm*—Flehr, Hohbach, Test, Albritton & Herbert

[57] ABSTRACT

Locking nut assembly for a bearing hub of a four wheel drive vehicle. The hub is externally threaded hub and has a longitudinally extending slot, and a nut is threadedly mounted on the hub. A retainer fits over the nut and has a multi-sided peripheral flange which surrounds the nut and a tang which extends into the slot in the hub to prevent rotation of the nut relative to the hub. A retaining ring mounted peripherally of the retainer extends through notches in the corner portions of the peripheral flange and the nut to hold the retainer on the nut.

7 Claims, 2 Drawing Sheets

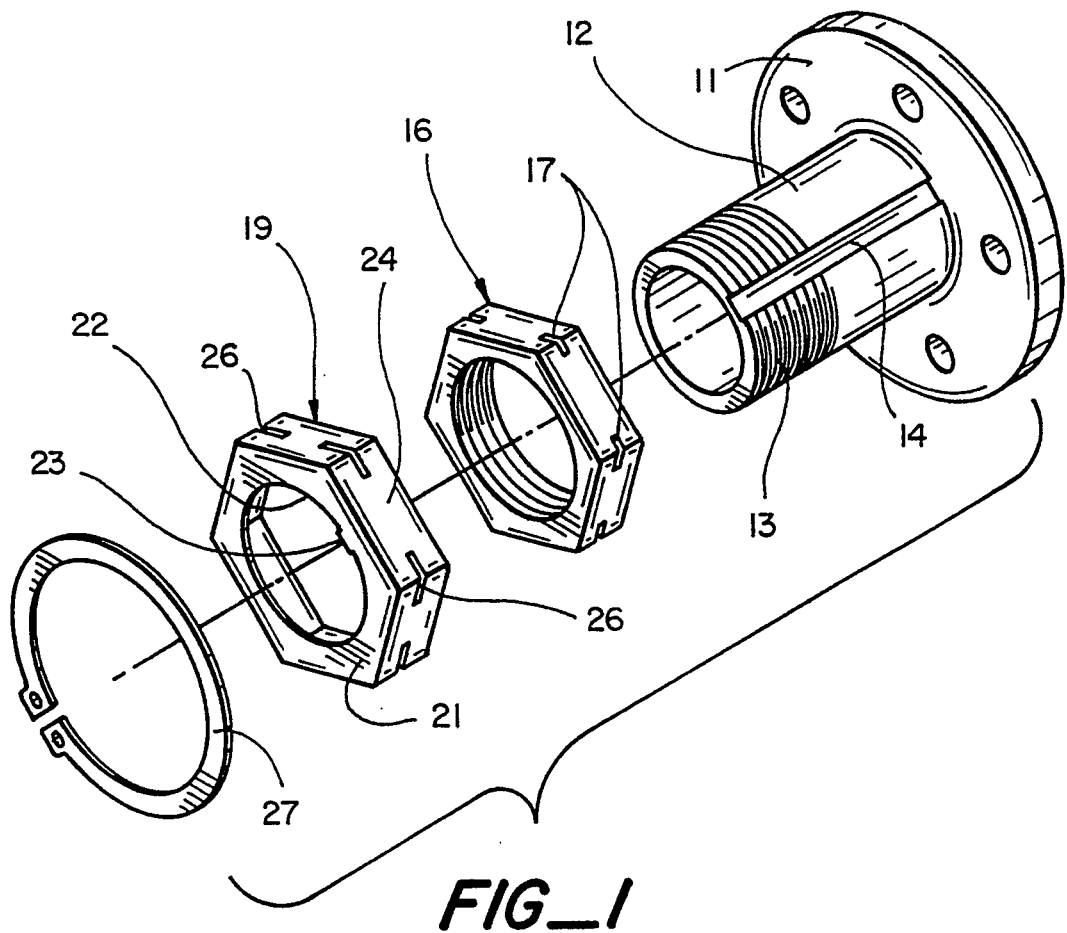
FIG_1
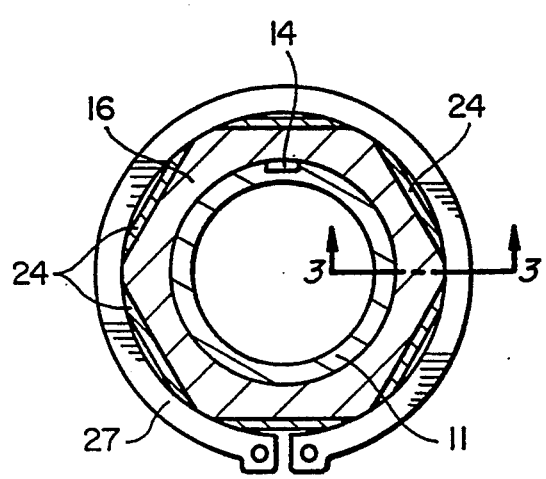
FIG_2

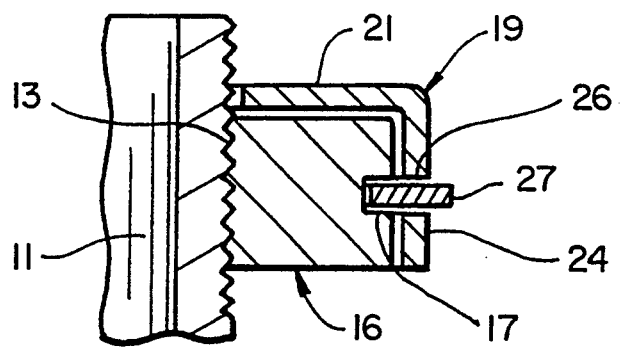
FIG_3
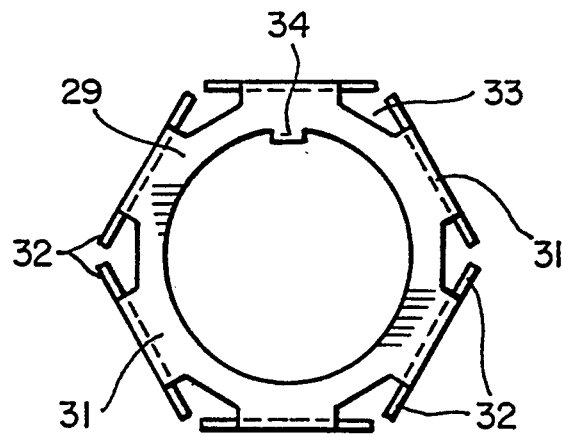
FIG_4
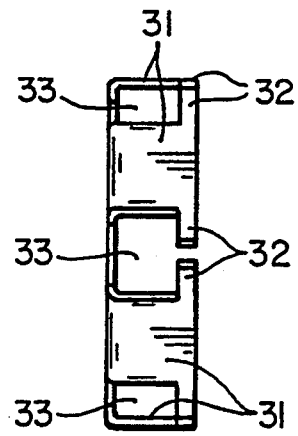
FIG_5
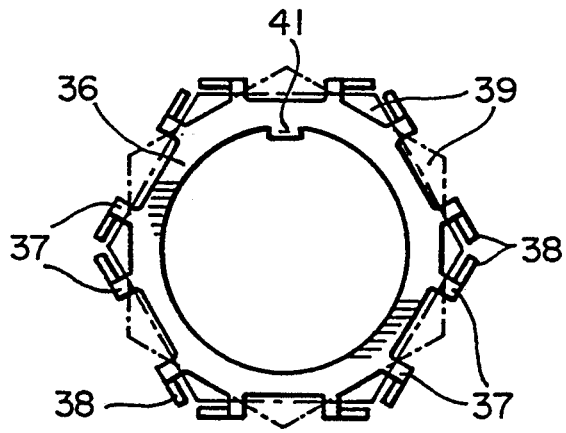
FIG_6
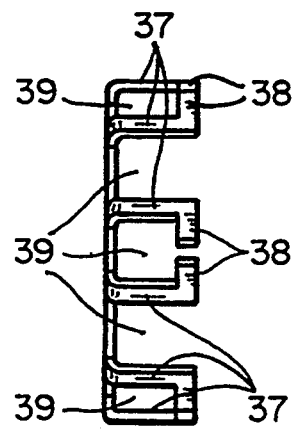
FIG_7

LOCKING NUT ASSEMBLY FOR BEARING HUB OF FOUR WHEEL DRIVE VEHICLE

This invention pertains generally to locking fasteners and, more particularly, to a locking nut assembly for a bearing hub of a four wheel drive vehicle.

Nuts employed on the bearing hubs of the front wheels of four wheel drive vehicles have a tendency to work loose from vibration and rotation of the parts secured thereby, and techniques heretofore employed for locking such nuts in place have not been entirely successful. Similar problems also exist with rear wheel hubs on vehicles with independent rear suspension.

It is in general an object of the invention to provide a new and improved locking nut assembly which is particularly suitable for use on the bearing hubs of four wheel drive vehicles.

Another object of the invention is to provide an assembly of the above character which overcomes the limitations and disadvantages of nut locking techniques heretofore employed on the bearing hubs of four wheel drive vehicles.

These and other objects are achieved in accordance with the invention by providing an externally threaded hub having a longitudinally extending slot, a nut threadedly mounted on the hub, and a retainer which fits over the nut and has a multi-sided peripheral flange which surrounds the nut and a tang which extends into the slot in the hub to prevent rotation of the nut relative to the hub. A retaining ring mounted peripherally of the retainer extends through notches in the corner portions of the peripheral flange and the nut to hold the retainer on the nut.

FIG. 1 is an exploded isometric view of one embodiment of a locking nut assembly according to the invention.

FIG. 2 is a cross sectional view of the embodiment of FIG. 1.

FIG. 3 is an enlarged cross-sectional view taken along line 3—3 in FIG. 2.

FIG. 4 is plan view of an alternate form of a retainer for use in the embodiment of FIG. 1.

FIG. 5 is a side elevational view of the retainer of FIG. 4.

FIG. 6 is a plan view of another retainer for use in the embodiment of FIG. 1.

FIG. 7 is a side elevational view of the retainer of FIG. 6.

In the drawings, the invention is illustrated in conjunction with the bearing hub 11 for the front wheel of a four wheel drive vehicle. This hub has a generally cylindrical surface 12 on which the bearings (not shown) are mounted, an externally threaded outer portion 13 and a longitudinally extending slot 14 of generally rectangular cross-section.

A nut 16 is mounted on the threaded portion for retaining the bearings on the hub. This nut has a multi-sided body, with notches 17 formed in the corner portions thereof. In the embodiment illustrated, the nut is shown as a conventional hex nut with six flats or sides, but it can have any number of sides or noncircular shape desired. The corner notches can either be in the form of individual notches in the corners of the nut, as shown, or they can be in the form of a slot which opens through all or part of the flat surfaces between the corners as well.

A retainer 19 fits over the nut and prevents it from turning on the hub. This element has a generally annular body 21 with a circular central opening 22 and a tab or tang 23 which extends radially into the opening and is received in the slot in the hub. The body has polygonal outer perimeter, with a peripheral flange 24 which extends at right angles to the body. In the embodiment of FIG. 1, the flange is in the form of a short six-sided cylinder of slightly greater diameter than the nut. When the retainer is placed over the nut, the flange surrounds the nut and engages the sides of the nut to prevent it from turning. Notches 26 open through the corners of the flange. The retainer is fabricated as a unitary structure by stamping it from steel or other suitable material.

The retainer is held on the nut by a retaining ring 27 which in the embodiment illustrated is a conventional snap ring. This ring is mounted peripherally of the retainer and extends through the notches in the corner portions of the peripheral flange and the nut.

In operation and use, the nut is threaded onto the hub and tightened to hold the bearings in place. The retainer is then placed over the nut, with the tang extending into the slot in the hub to prevent further rotation of the nut, and the retaining ring is installed in the notches to hold the retainer in place.

In the embodiments of FIGS. 4-7, the peripheral flange of the retainer consists a series of individual fingers or flanges, rather than a single, continuous flange as in the embodiment of FIG. 1. In the embodiment of FIG. 4, the retainer has a six-sided annular body 29, with six T-shaped fingers or flange sections 31 extending radially therefrom and bars 32 at the outer ends of the fingers. The fingers are bent over at right angles to the body, with the outer portions of the fingers forming an interrupted flange which extends peripherally of the nut. The spaces 33 between adjacent ones of the fingers form openings or notches through which the retaining ring can pass. A tang 34 extends inwardly from the body for interlocking engagement with the slot in the hub. As in the embodiment of FIG. 1, the locking plate is preferably fabricated as a unitary structure by stamping from steel or other suitable material.

In the embodiment of FIG. 6, the retainer has a six-sided annular body 36, with twelve L-shaped fingers or flange sections 37 extending radially from the corner portions thereof. The fingers are arranged in pairs, with the two fingers in each pair being oriented with their outer sections 38 facing each other. The fingers are bent over at right angles to the body, with outer sections 38 forming an interrupted flange which extends peripherally of the nut. The spaces 39 between adjacent ones of the fingers form openings or notches through which the retaining ring can pass. A tang 41 extends inwardly from the body for interlocking engagement with the slot in the hub. As in the other embodiments, the locking plate is preferably fabricated as a unitary structure by stamping from steel or other suitable material.

With the twelve fingers or flange sections in the embodiment of FIG. 6, the retainer can receive the nut in any one of twelve positions relative to the tang and hub, six with the corners of the nut between the fingers in each pair, and six with the corners of the nut between the fingers in adjacent pairs.

Although the invention has been described with specific reference to the front bearing hub of a four wheel drive vehicle, it is not limited to that particular application and can be employed for retaining nuts on other threaded parts with keyways or slots as well.

It is apparent from the foregoing that a new and improved locking nut assembly has been provided. While only certain presently preferred embodiments have been described in detail, as will be apparent to those familiar with the art, certain changes and modifications can be made without departing from the scope of the invention as defined by the following claims.

I claim:

1. In a locking nut assembly for a bearing hub of a four wheel drive vehicle: an externally threaded hub having a longitudinally extending slot formed therein, a nut having a multi-sided body with notches formed in the corner portions thereof threadedly mounted on the hub, a retainer which fits over the nut and has a tang which extends into the slot in the hub and a multi-sided peripheral flange which surrounds the nut to prevent rotation of the nut relative to the hub, notches opening through the corner portions of the peripheral flange, and a retaining ring mounted peripherally of the retainer and extending through the notches in the peripheral flange and the nut to hold the retainer on the nut.

2. The locking nut assembly of claim 1 wherein the retaining ring comprises a snap ring.

3. The locking nut assembly of claim 1 wherein the retainer comprises a generally annular body having a circular central opening with a tab extending radially into the opening to form the tang, and a polygonal outer perimeter from which the peripheral flange extends at right angles to the body.

4. The locking nut assembly of claim 1 wherein the retainer is formed as a unitary structure.

5. The locking nut assembly of claim 1 wherein the peripheral flange of the retainer has a plurality of L-shaped fingers arranged in pairs, with outer sections in adjacent ones of the fingers facing toward each other and defining the notches at the corner portions of the flange.

6. In an assembly for retaining a nut on an externally threaded part having a longitudinally extending slot formed therein: a retainer which fits over the nut and has a tang which extends into the slot and a peripheral flange which engages the periphery of the nut to prevent rotation of the nut relative to the threaded part, said nut and said peripheral flange each having notches formed in corner portions thereof, and means comprising a ring which is mounted peripherally of the retainer and extends into the notches for retaining the retainer in engagement with the nut.

7. In an assembly for retaining a nut on an externally threaded part having a longitudinally extending slot formed therein: a retainer which fits over the nut and has a tang which extends into the slot and a plurality of L-shaped fingers which engage the periphery of the nut to prevent rotation of the nut relative to the threaded part, said L-shaped fingers being arranged in pairs, with outer sections of adjacent ones of the fingers facing toward each other at corners of the nut, and means for retaining the retainer in engagement with the nut.

* * * * *